Jan. 13, 1959   J. CAUTHON   2,868,556
MOVABLE LOAD CARRYING PLATFORM FOR NESTING CART
Filed May 14, 1957   2 Sheets-Sheet 1
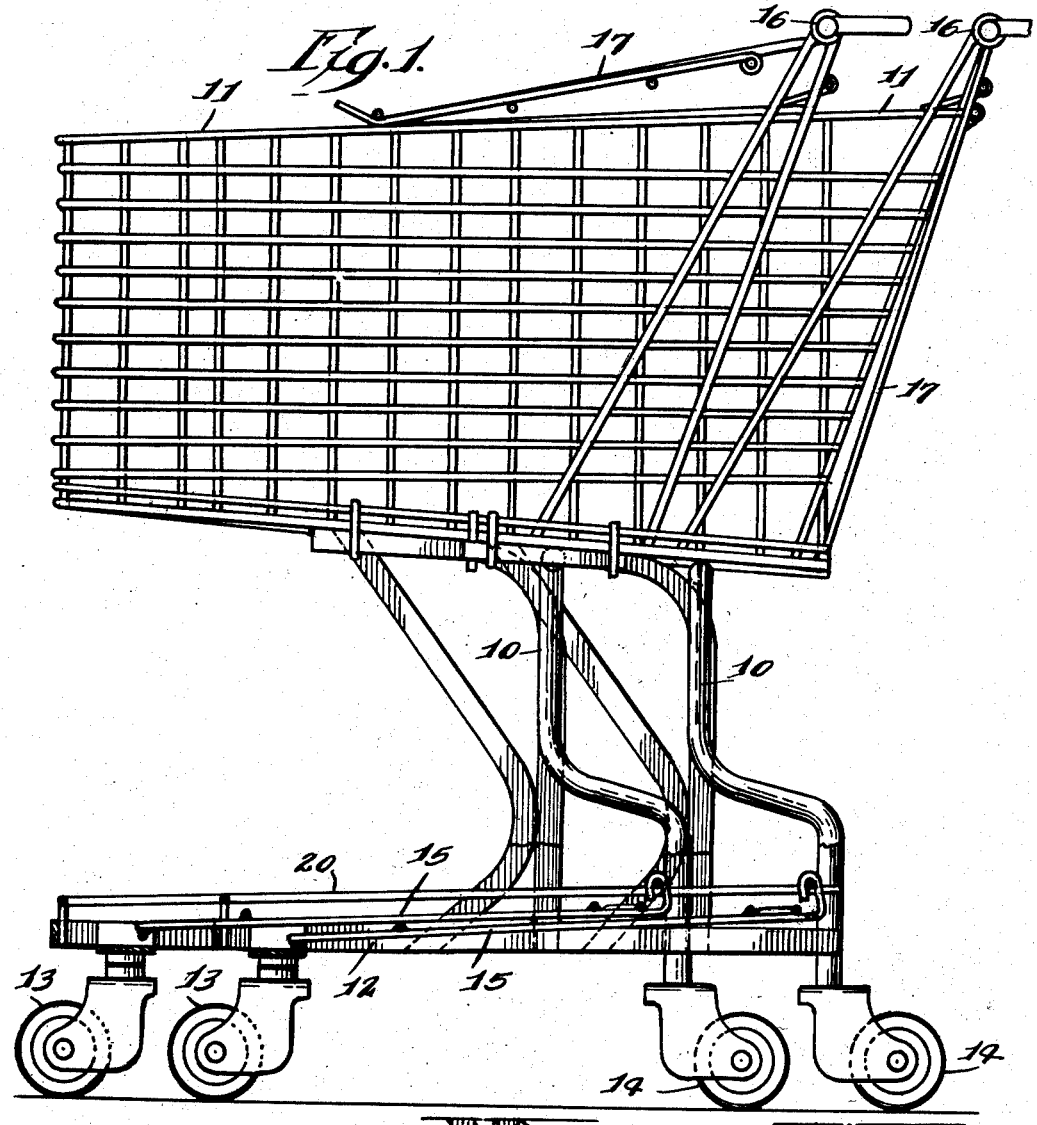
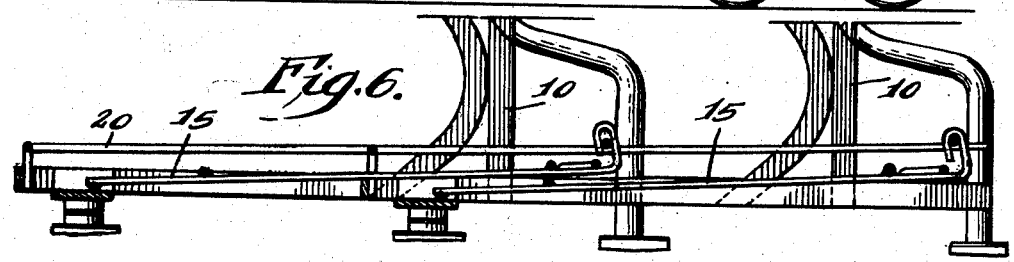

Jan. 13, 1959 J. CAUTHON 2,868,556
MOVABLE LOAD CARRYING PLATFORM FOR NESTING CART
Filed May 14, 1957 2 Sheets-Sheet 2
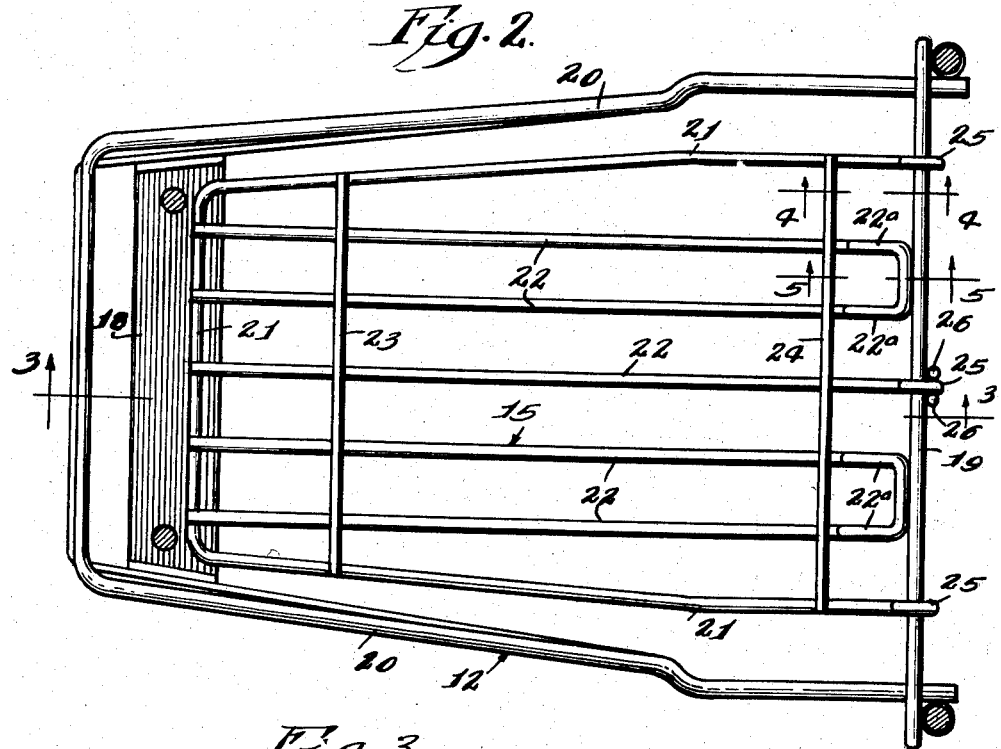
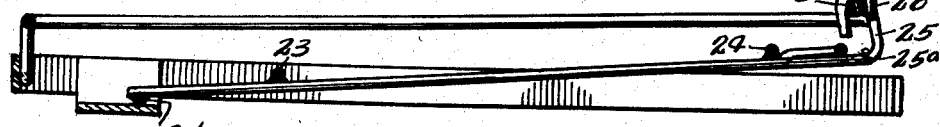
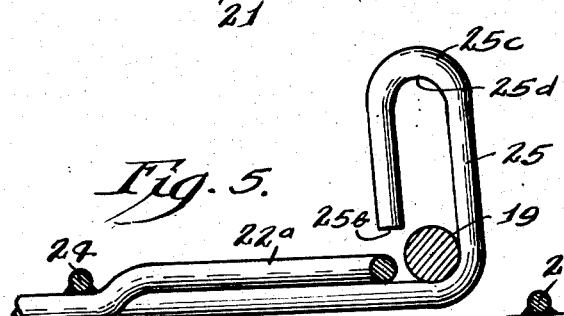
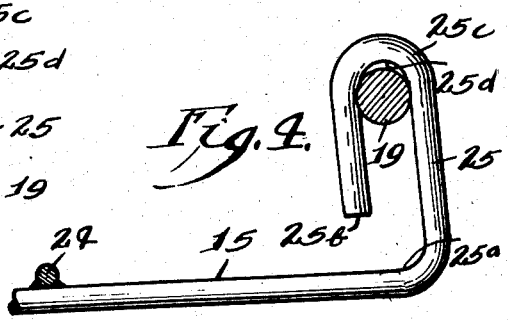
Inventor.
Jack Cauthon.
Schmeder, Halgren,
Brady & Wegner
Attorneys.

United States Patent Office 2,868,556
Patented Jan. 13, 1959

2,868,556
MOVABLE LOAD CARRYING PLATFORM FOR NESTING CART

Jack Cauthon, Jackson, Mich., assignor, by mesne assignments, to Tote-Cart Company, Chicago, Ill., a partnership Application May 14, 1957, Serial No. 659,050

6 Claims. (Cl. 280—33.99)

This invention relates to a portable merchandise cart of the type normally used in supermarkets and the like.

The cart of this invention is adapted to be internested with other similar carts so as to occupy relatively small space and is preferably made of wire so as to be light in weight. It is supported on a plurality of wheels for movement over the floor and is adapted to be propelled by means of a handle. This type of cart is well-known and is widely used by shoppers in supermarkets and similar self-service stores.

One of the objects of this invention is to provide a merchandise cart of the above type having an improved base construction permitting easier nesting of a plurality of the carts and easier separation of the internested carts.

Another object of the invention is to provide an improved cart including a bottom movable platform having improved means for installing and removing this platform from the cart.

Other objects and advantages of the invention will be apparent from the following description of one embodiment thereof taken in conjunction with the accompanying drawings. Of the drawings:

Fig. 1 is a side elevational view showing a pair of carts embodying the invention in internested relationship.

Fig. 2 is a sectional plan view showing only the base and bottom platform of a cart embodying the invention.

Fig. 3 is an enlarged sectional view taken substantially along line 3—3 of Fig. 2.

Fig. 4 is an enlarged sectional elevational view taken substantially along line 4—4 of Fig. 2.

Fig. 5 is an enlarged sectional view taken substantially along line 5—5 of Fig. 2 but showing the platform in raised position.

Fig. 6 is a fragmentary side elevational view showing the bases of two carts in partially internested arrangement.

The cart of this invention as shown in the accompanying drawings comprises a frame 10, a forwardly projecting basket 11 at the top thereof, a base 12 provided with a pair of front caster wheels 13 at the front thereof and a pair of rear wheels 14 and a bottom platform 15 movably supported on the base 12. The top of the frame 10 is provided with an ordinary handle 16 for propelling each cart over a floor or other surface and the rear of each basket 11 is provided with a movable rear wall 17 hingedly mounted at its top so as to be moved upwardly as shown in Fig. 1 when one basket 11 is internested into the basket of a similar cart. As is customary in carts of this nature, the frame, upper basket and other parts of the cart are made of wires, with the wires at the joints welded or otherwise attached together in order to give the cart strength and stability while maintaining relatively light weight.

The features of this invention are embodied in the bottom of the cart including the base 12 and platform 15. The base is forwardly tapered as shown clearly in Fig. 2 and includes a front cross-member or metal plate 18, a rear cross-member or transverse wire 19 and a side and front wire 20 of generally U-shape. The transverse wire 19 is at the rear of the platform 15 while the plate 18 is at the front of the base 12.

Mounted on the base but movable vertically and arcuately in relationship thereto is the platform 15. This platform is forwardly tapered and is normally sloped slightly forwardly and downwardly. It is normally supported at its front end by resting on the front metal plate 18 and is supported at its rear end by the transverse wire 19. This transverse wire is at a higher elevation than the plate 18.

The platform 15 is in the form of a grating that includes a U-shaped side and front wire 21, substantially parallel spaced longitudinally extending wires 22 and front and rear transverse wires 23 and 24. This assembly of wires is welded together at their points of intersection in order to make a sturdy yet lightweight platform.

The rear end of each side wire 21 and of the center longitudinal wire 22 is bent to form a linkage member or hook 25. Each hook 25 is vertically elongated and extends generally upwardly from the platform 15. The hook is bent to have an internal opening 25a in which the supporting wire 19 is normally located. The vertical dimension of the internal opening 25a is considerably larger than the diameter or corresponding dimension of the supporting wire 19. It is preferred that this vertical dimension be at least double and preferably at least four times the vertical dimension or diameter of the member 19.

In its preferred form as shown in the drawings, each linkage member or hook 25 is formed as a continuation of its wire 21 or 22. The extreme end 25b of the hook wire 25 is spaced from the adjacent wire of the platform 15 in order to leave a forward opening that is slightly greater than the diameter of the supporting wire 19. In the embodiment shown, this distance is about 1/16 to 1/8 inch greater than the diameter of the wire 19.

In order to retard rattling of the platform 15 on the rear support wire 19, the top part 25c of the wire portion that is bent to form the hook 25 has its inner surfaces upwardly tapered as shown in Fig. 3 with this upper taper having a transverse dimension less than the diameter of the wire 19. This construction, which is illustrated in Fig. 3 causes the sides of the upper inner surface 25d of the wire section 25c to contact the supporting wire 19 at the upper side surfaces thereof.

In order to prevent the hooks 25 from being accidentally dislodged from around the supporting wire 19, the rear of the platform 15 is provided with spring means normally blocking the passageway formed by the wire end 25b but movable from this blocking position to permit the supporting wire 19 to pass through these passageways. In the embodiment shown, each spring means comprises the adjacent ends of a pair of adjacent longitudinal wires 22. Thus in the embodiment shown, each adjacent pair of wires 22 is one continuous U-shaped wire with the rear portion 22a being adjacent to the supporting wire 19. As can be seen most clearly in Fig. 4, each rear portion 22a is displaced upwardly out of the plane of the remainder of the wires 22. This rear portion 22a acts as a spring member. With this arrangement, there are two of the spring end portions 22a provided, with each being located inwardly of a side wire 21 and both being located on opposite sides of the longitudinal center wire 22. In order to hold the platform against excessive lateral sliding, the wire 19 has welded thereto a pair of short vertical wires 26 each on opposite sides of the central hook 25.

The described invention permits much easier internesting and subsequent separation of two or more of the carts of this invention. As is shown in Figs. 1 and 2, when the carts are internested, the base 12 of the rearmost cart rides under the platform of the forward cart and tends to raise it away from the front and rear supporting members 18 and 19. Because of the loose connection caused by the elongated hooks 25, the platform 15 easily moves upwardly to permit the internesting. This loose construction also results in the internested carts being easily separated. When internested the platforms are approximately horizontal.

As pointed out previously, the platform 15 may be easily removed from the cart when desired. The front end of the platform is easily removed as it merely rests on the front member 18. The rear of the platform is easily removed from the wire 19 by springing the members 22a out of blocking position to permit the rear support wire 19 to pass through the passageway formed by the wire end 25b as illustrated most clearly in Fig. 5.

In all of the prior art carts of which applicant is aware, the lower platform was hingedly mounted on the base by providing certain of its end pieces with eyes which fitted reasonably snugly over a rear transverse wire or rod in such a manner as not to permit vertical movement of the rear of the platform. This proved to have drawbacks. It resulted in the platform having a steep slope causing goods placed thereon to slide toward the front (even over the front onto the floor unless extreme care was exercised) and permitting the storing only of small objects on the back because of lack of space between the back portion of the platform and the bottom of the upper basket. It was also costly to assemble as each eye had to be manufactured with a substantial opening so as to permit placing it on the transverse wire and the eye would then have to be closed by a hand tool.

The present invention solves these difficulties and adds another feature which was not foreseen. By reason of the elongated hooks the platform is relatively level but it is possible to slide the front of a second cart under the rear of the first cart. When this is done the rear of the platform of the first cart is first elevated and then as the second cart progresses forwardly the front is also elevated. When the front of the second cart approaches a position against the front portion of the first cart as shown in Fig. 1 of the drawing, the platform on the first cart first teeters and then falls back into its original position. The unexpected feature was that it was found to be much easier to nest the carts when both the rear and the front of the platform were vertically movable and first the rear and then the front are moved. With the construction of the present invention much less force is required to nest than was required with the prior art where the entire platform had to be forced upwardly in one movement.

Furthermore the hooks can be made exactly as required for successful operation on forming machinery and then may be inserted over the wires or rods 19 by a combined backward movement and application of pressure against the springs causing the hooks to snap into place and be prevented from accidental dislodgement by the springs. In case it is desired to remove the platform a reverse movement is all that is required. This spring stop arrangement is of particular advantage with elongated hooks of this type because, with a hand tool, it is extremely difficult to bend the ends of the wires 25b so that they are exactly parallel with the main portions thereof. These two portions must be almost exactly parallel or the hooks will bind on the rod 19 when moved up and down if the ends 25b are bent in too far, or the hooks will readily be pushed off the rod if their ends are not bent inwardly far enough for the springs to act as stops.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:
1. A portable merchandise cart adapted to be arranged in internested relationship with a similar cart, comprising: a frame; a forwardly projecting upper basket thereon; a forwardly tapered base on the frame including a front cross-member and a rear cross-member at a higher elevation than said front cross-member; and a forwardly tapered platform normally supported at its front and rear by said cross-members but movable upwardly with respect to both of said cross-members, the rear of the platform having a plurality of vertically elongated linkage members extending generally upwardly therefrom having internal openings in which the rear cross-member is located, each opening having its vertical dimension considerably larger than the corresponding dimension of the rear cross-member to permit vertical movement of the rear of the platform relative to the rear cross-member when another similar cart base and platform are positioned thereunder.

2. The cart of claim 1 wherein the inner surfaces of the linkage members are upwardly tapered with a transverse dimension less than that of the top of the rear cross-member to retard rattling of the platform on the rear cross-member.

3. The cart of claim 1 wherein said vertical dimension is at least three times the diameter of said transverse wire.

4. A portable merchandise cart, comprising: a frame; a forwardly projecting upper basket thereon; a forwardly tapered base on the frame including a front cross-member and a rear cross-member at a higher elevation than said front cross-member including a transverse wire; and a forwardly tapered platform normally supported at its front and rear by said cross-members but movable upwardly with respect to both of said cross-members including a wire grating, the rear of the platform having a plurality of vertically elongated wire linkage members extending generally upwardly therefrom having internal openings in which the rear transverse wire is located and a forward passageway adjacent to the platform slightly wider than the corresponding thickness of said transverse wire, each rear linkage member opening having its vertical dimension considerably larger than the diameter of the rear transverse wire to permit vertical movement of the rear of the platform relative to said transverse wire when another similar cart base and platform are positioned thereunder; and spring wires on said platform normally blocking said passageway but movable therefrom to permit passage of the rear cross-member therethrough.

5. The cart of claim 4 wherein said spring wires form a part of said grating and include U-shaped wire sections positioned above, but generally parallel to, the plane of said grating.

6. A portable merchandise cart adapted to be arranged in internested relationship with a similar cart, comprising: a frame, a forwardly projecting upper basket thereon; a forwardly tapered base on the frame including a front cross-member and a rear cross-member at a higher elevation than said front cross-member; a forwardly tapered platform normally supported at its front and rear by said cross-members; and means located at the rear of the platform for attaching the rear of said platform to said cross-member, said means permitting both vertical and pivotal movement of the rear of the platform and of the entire platform with respect to said cross-member.

References Cited in the file of this patent
UNITED STATES PATENTS

| | | |
|---|---|---|
| 2,583,513 | Maslow | Jan. 22, 1952 |
| 2,583,514 | Maslow | Jan. 22, 1952 |
| 2,662,775 | Goldman | Dec. 15, 1953 |

FOREIGN PATENTS

| | | |
|---|---|---|
| 688,130 | Great Britain | Feb. 25, 1953 |